(12) United States Patent
Muppidi et al.

(10) Patent No.: US 8,112,370 B2
(45) Date of Patent: Feb. 7, 2012

(54) CLASSIFICATION AND POLICY MANAGEMENT FOR SOFTWARE COMPONENTS

(75) Inventors: Sridhar R Muppidi, Austin, TX (US); Nataraj Nagaratnam, Austin, TX (US); Anthony Joseph Nadalin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 12/235,900

(22) Filed: Sep. 23, 2008

(65) Prior Publication Data

US 2010/0076914 A1 Mar. 25, 2010

(51) Int. Cl.
*G06N 5/00* (2006.01)

(52) U.S. Cl. .......................................... 706/14; 706/45
(58) Field of Classification Search .................... 706/14, 706/45

See application file for complete search history.

(56) References Cited

U.S. PATENT DOCUMENTS

| | | |
|---|---|---|
| 2004/0093381 A1 | 5/2004 | Hodges et al. |
| 2006/0046691 A1 | 3/2006 | Nishio |
| 2007/0033194 A1 | 2/2007 | Srinivas et al. |
| 2007/0050376 A1 | 3/2007 | Maida-Smith et al. |

OTHER PUBLICATIONS

Benediktsson et al, Neural Network Approaches Versus Statistical Methods in Classification of Multisource Remote Sensing Data, IEEE Transactions on Geoscience and Remote Sensing, vol. 28, No. 4, Jul. 1990, pp. 540-552.*
Ed Ort, What's new in SOA and web services?, Oct. 3, 2005, 8, Sun Developer Network.

* cited by examiner

*Primary Examiner* — Wilbert L Starks
(74) *Attorney, Agent, or Firm* — Garg Law Firm, PLLC; Rakesh Garg; Jeffrey S. LaBaw

(57) ABSTRACT

A method, system, and computer usable program product for classification and policy management for software components are provided in the illustrative embodiments. A metadata associated with an application or component is identified. A mapping determination is made whether the metadata maps to a classification in a set of classifications. A policy that is applicable to the classification is identified and associated with the classification. If the mapping determination is deterministic, the component is assigned to the classification and the policy associated with the classification is associated with the component. If the mapping determination is not deterministic, a user intervention may be necessary, the component may be classified in a default classification, or both. Because of the policy being associated with the classification, associating the policy with the component may occur based on the metadata of the application or component and its resultant classification.

34 Claims, 4 Drawing Sheets

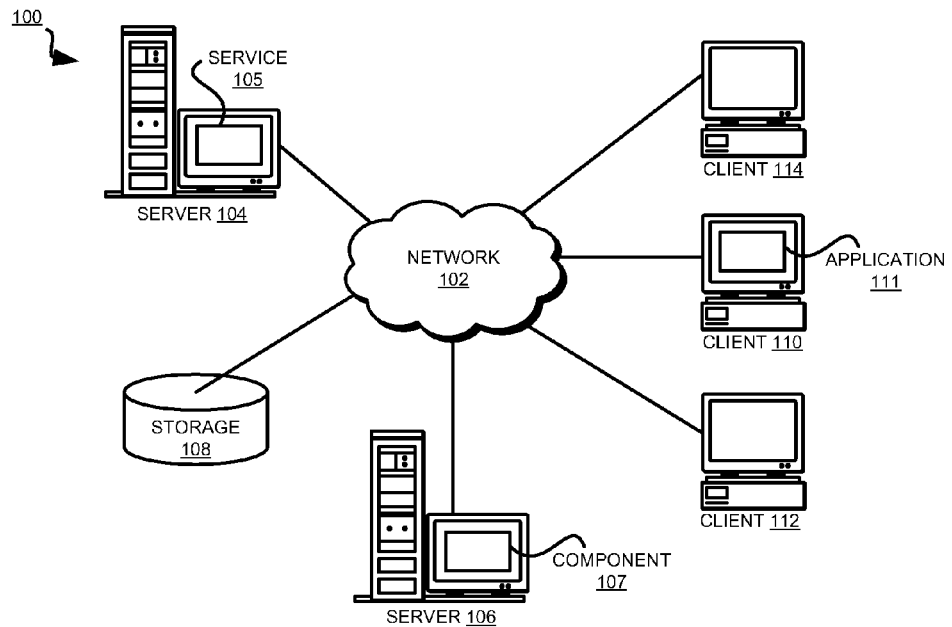
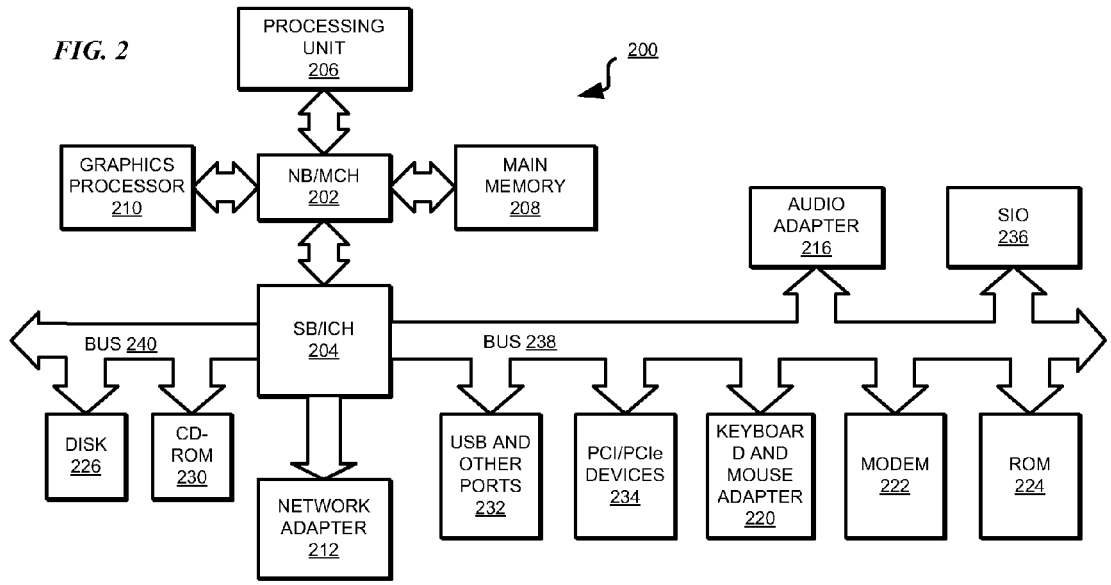

FIG. 4

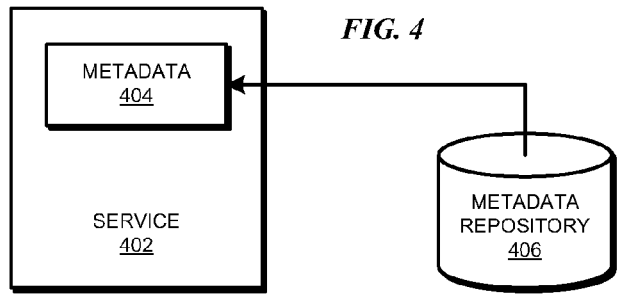

FIG. 5

| EXTERNAL ACCESS 522 | INTERNAT ACCESS 524 | OTHER CLASSIFICATIONS |
|---|---|---|
| PO, ORDER PROCESS, APPLICATION,... 512 — PURCHASE ORDER SERVICE 502 | MONTHLY BILLING, INVOICE, INVOICING,... 516 — BILLING SERVICE 506 | ... |
| CUSTOMER CLAIM, NATURAL DISASTER CLAIM,... 514 — CLAIM SUBMISSION SERVICE 504 | QUOTE, PRICING,... 518 — QUOTE SERVICE 508 | |
| ... | EVALUTION, CLAIM ADJUSTMENT,... 520 — ADJUSTMENT SERVICE 510 | |
| | ... | |

SECURITY POLICY FOR EXTERNAL ACCESS
- SAML TOKEN
- MESSAGE LEVEL PROTECTION
- LDAP AUTHENTICATION
526

SECURITY POLICY FOR INTERNAL ACCESS
- KERBEROS TOKEN
- TRANSPORT LEVEL PROTECTION
- LDAP AUTHENTICATION
528

POLICY TEMPLATE

530

CLASSIFICATION AND POLICY MANAGEMENT FOR SOFTWARE COMPONENTS

BACKGROUND OF THE INVENTION

1. Field of the Invention

The present invention relates generally to an improved data processing system, and in particular, to a computer implemented method for managing applications in a data processing environment. Still more particularly, the present invention relates to a computer implemented method, system, and computer usable program code for classification and policy management for software components.

2. Description of the Related Art

A software application may include many components. A software application is also known as an application and a component of an application is a subpart of the application. Metadata is the information that defines an application, a component or is associated with a component or an application.

Generally, an application can be thought of as implementing a process, and a component implementing a part of that process. The process and the process' sub-processes manifest themselves as functionality in an application and the application's components. In some cases, a component may be an entire application, and vice versa.

An application may be divided into components based on a variety of factors. For example, certain functionality of the application may be common across many applications. A software designer may create a component such that the component is reusable in another application when a need arises.

As another example, a certain functionality of an application may have be separate from and execute in a data processing system different from the other functionality of the application. Many applications have external facing components that may be accessible to anyone over a public data network, and internal facing components that may access business sensitive information over a business' own data network.

Furthermore, a component may implement only a partial functionality, and many components executing on many data processing systems across one or more data networks in a concerted manner may appear to be a unified application to a user. A software designer may implement a component as a standalone fully functional application, a reusable component that may need other components or data to operate, a component dedicated for use by only designated applications, or a shared component that any application with suitable privileges may use. Of course a component may take may other forms depending on the particular application and data processing environment.

A service is a type of application or component. A web service is a type of service. Generally, a service is a business process or sub-process encapsulated in a way that is substantially independent of an operating system, a data processing system, or a data processing environment. Services may be distributed across data processing systems and may communicate with each other and exchange data over data networks.

Generally, services, including web services, are created according to a common scheme, convention, protocol, schema, specification, methodology, or standard. Created in this manner, services can interact and collaborate predictably with other services. Service-oriented architecture (SOA) is a design methodology for designing, distributing, and using services created in this manner.

Software designers may combine or reuse services to create or modify applications. For example, a new business application may be created entirely or partly from existing services. Similarly, a new functionality may be added to an existing application by incorporating a service.

Applications may operate in a data processing environment under the guidance, control, permission or supervision of one or more policies applicable to that data processing environment. A policy is a rule for providing guidance, control, permission, supervision, or other similar features to users, applications, or components operating in a given data processing environment. For example, a business organization may have business policies describing the circumstances under which a user, application, or component may not access the business critical data of the organization. As another example, a policy may determine what information a particular component may have to present to be authenticated in a given data processing system.

SUMMARY OF THE INVENTION

The illustrative embodiments provide a method, system, and computer usable program product for classification and policy management, for software components. A metadata associated with a component is identified. A mapping determination is made whether the metadata maps to a classification in a set of classifications. If the mapping determination is true, the component is assigned to the classification and a policy associated with the classification is associated with the component.

In addition, the policy that is applicable to the classification is identified or defined. The identified or defined policy is associated the classification. Furthermore, because of the policy being associated with the classification, associating the policy with the component may occur automatically from assigning the component to the classification.

In one embodiment, the policy is a policy template. A policy template determination is made whether the policy template is associated with the component, the classification, or both. If the policy template determination is true, a second policy is created based on the policy template. The second policy is associated with one of the component and the classification. In an embodiment, associating the second policy may replace the policy template with the second policy. In another embodiment, associating the second policy may associate the second policy in addition to the policy template.

Additionally, the set of classifications is created such that a first classification in the set of classifications is distinct from a second classification in the set of classifications. The first and second classifications may be distinct from one another because of a difference in a characteristic of a first set of components that can be classified under the first classification and the characteristic of a second set of components that can be classified under the second classification. The characteristic is similar among the components in the first set of components, similar among the components in the second set of components. The characteristic may be provided in a metadata associated with a component, may be interpreted from the metadata, may be described in the component, may be described in reference to the component, or any combination thereof.

In one embodiment, the component may be a service. Additionally, if the mapping determination is false, a user may be notified, the component may be classified in a default classification, or both.

BRIEF DESCRIPTION OF THE DRAWINGS

The novel features believed characteristic of the invention are set forth in the appended claims. The invention itself;

however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 depicts a block diagram of a data processing system in which illustrative embodiments may be implemented;

FIG. 4 depicts a block diagram of a service configured according to an illustrative embodiment;

FIG. 5 depicts a block diagram of a classification of services in accordance with an illustrative embodiment;

DETAILED DESCRIPTION OF THE PREFERRED EMBODIMENT

Figure 3:
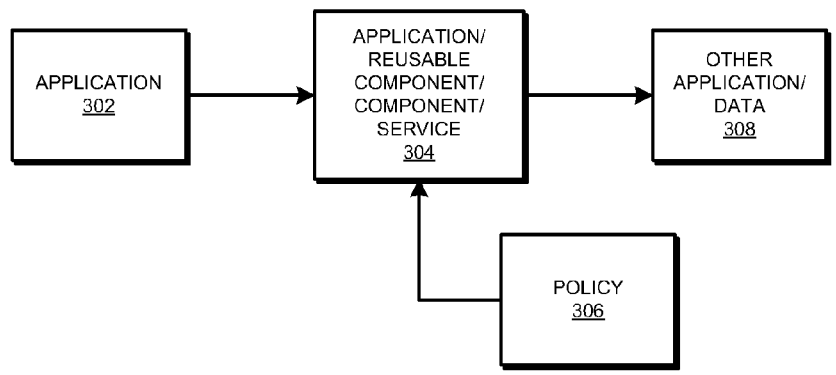
FIG. 3 depicts a block diagram of an association of a policy with a service in accordance with an illustrative embodiment.

Illustrative embodiments recognize that in certain business organizations, users may be creating a variety of policies that have to be applied to components. For example, users in a business department may create business policies, such as a policy regarding a sequence of steps in which a particular business transaction should occur, or a policy regarding what information should be obtained to process a particular purchase order. As another example, users in the information technology department may create policies that determine what credentials may be needed to gain access to certain data or system.

Illustrative embodiments further recognize that business processes and applications are becoming increasingly complex and large. With increasingly complex and large applications, the number and complexity of components interacting in those applications has also increased. In some data processing environments, the number of components interoperating may be in the hundreds or thousands.

Simultaneously, the number of policies in an average sized organization can also be non-trivial. In addition, some policies may contradict with each other when applied to certain components. Illustrative embodiments recognize that in these and other similar circumstances, a user, such as a system administrator or policy enforcement personnel, may find it difficult to correctly associate a set of policies with a component. A set of policies is one or more policies.

Furthermore, the user may have to keep the associations of policies and components up to date as the policies change, the components change, new policies are added, or new components are added. Illustrative embodiments recognize that with the proliferation of components and policies, a method and system is needed for efficiently managing the association of components and policies.

To address these and other problems related to versioning documents, the illustrative embodiments provide a method, system, and computer usable program product for classification and policy management for software components. The illustrative embodiments may be used in conjunction with any application or any data processing system that may use components, including but not limited to services or web service. The illustrative embodiments are described using services as an example of components to which the illustrative embodiments are applicable. Description of illustrative embodiments using services, however, is only used as an example and is not intended to be limiting on the illustrative embodiments.

For example, the illustrative embodiments may be implemented with any business application, enterprise software, and middleware applications or platforms. Additionally, the illustrative embodiments may be implemented in conjunction with a hardware component, such as in a firmware, as embedded software in a hardware device, or in any other suitable hardware or software form.

Any advantages listed herein are only examples and are not intended to be limiting on the illustrative embodiments. Additional advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications or components thereof may execute on any computer in data processing environment 100. In the depicted example, server 104 includes service 105, which may be an example software component, in conjunction with which the illustrative embodiments may be implemented. As another example, component 107 may be another type of component that may execute in server 106.

In addition, clients 110, 112, and 114 couple to network 102. Any of clients 110, 112, and 114 may have an application, typically a client application, executing thereon. As an example, client 110 is depicted to have application 111 executing thereon. In one embodiment, application 111 may be a browser, such as a commonly used web-browser.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications, their components, and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206; main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USE) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an association of a policy with a service in accordance with an illustrative embodiment. Application 302 may be an application, such as application 111 in FIG. 1, or a component, such as component 107 in FIG. 1.

Application 302 may call, connect, or otherwise interact with component 304. Component 304 may itself be an application, a component of an application, a reusable component of another application, a service, or any other embodiment of code that may operate in the manner of a component. Policy 306 may be associated with component 304. Policy 306 may specify how, when, or if component 304 may access other application or data 308, when interoperating with application 302.

For example, in an insurance company's data processing environment, application 302 may be a prospective client's browser. Using the browser, the prospective client may access the insurance company's website to request a quote. Component 304 may be a quote generating component, which may be a part of a larger application that may allow a user to receive quotes, submit claims, see payment history, and perform many other functions.

In one embodiment of this example, policy 306 may be a business policy that may require a client's consent checkmark in a particular field on the quote form before allowing access to other application or data 308, which may be a credit report generating system. In another embodiment, policy 306 may be a security policy of the information technology department of the insurance company. In such an example embodiment, policy 306 may specify that a string of characters from CAPTCHA form field (Completely Automated Public Turing test to tell Computers and Humans Apart) be correct before allowing access to other application or data 308, which may be data about rate comparison with other insurance companies.

With reference to FIG. 4, this figure depicts a block diagram of a service configured according to an illustrative embodiment. Service 402 is used only as an example for the clarity of the description and may be a service or a different type of component within the scope of the illustrative embodiments. For example, service 40.2 may be implemented using service 105 or component 107 in FIG. 1.

Service 402 includes metadata 404. Metadata 404 may provide a description of service 402. In one embodiment, metadata 404 may include a set of words called keywords that generally describe the nature, purpose, function, location, type, or another characteristic of service 402. In another embodiment, metadata 404 may be a set of sentences or phrases describing various aspects of service 402. In another embodiment, metadata 404 may be a set of codes where a code corresponds to an aspect or characteristic of service 402. A set of words, sentences, phrases, or codes is one or more words, sentences, phrases, or codes respectively.

Metadata 404 may be included in service 402 in a variety of ways. In one embodiment, metadata 404 may be embedded in the code of service 402. In another embodiment, metadata 404 may be loaded into a memory space of service 402 from a repository, such as metadata repository 406. Metadata repository 406 may be a database, a flat file, an index file, or any other data structure suitable in a particular implementation. In another embodiment, metadata 404 may be references to metadata entries in metadata repository 406. Metadata 404 may be included in service 402 in other ways depending on the implementation. For example, metadata 404 of service 402 may reference metadata of another service, such that the metadata of the other service is common to the two services.

In accordance with an illustrative embodiment, metadata 404 may be one or more forms of description of service 402. In one form of description, metadata 404 may be usage metadata. Usage metadata is metadata that provides information about how service 402 may be used. For example, usage metadata 404 may inform whether service 402 is external facing or internal facing. An external facing service is accessible to users external to a business organization over public data network. An internal facing service is accessible to users internal to the business organization, such as on a local area network (LAN).

In another form of description, metadata 404 may be deployment metadata. Deployment metadata is metadata that describes information relating to service 402's deployment in a data processing environment. For example, deployment metadata of service 402 may inform whether service 402 is deployed behind a firewall or in a demilitarized zone (DMZ), accessing a transaction on a particular system, such as DB2® or CICS®, or is hosted in a particular type of environment, such as J2EE® or .NET platform. DB2 and CICS are trademarks of International Business Machines Corporation in the United States and other countries. J2EE is a trademark of Sun Microsystems, Inc. in the United States and other countries. ".NET" refers to "Microsoft .NET", which is a trademark of Microsoft Corporation in the United States and other countries.

In another form of description, metadata 404 may be composition metadata. Composition metadata is metadata that describes information relating to service 402's interactions with other services, components, or applications in a data processing environment. For example, composition metadata of service 402 may inform how service 402, which may be an "Account Open" service on an insurance company's website communicates with "Credit Check" component in the insurance company's data processing environment. For example, the Account Open service may call a particular application programming interface (API) of "credit Check" component using remote procedure call (RPC) and supply a list of parameters.

The forms of metadata described here are only used as examples and are not intended to be limiting on the illustrative embodiments. Many other forms of metadata will be conceivable from this disclosure and the same is contemplated within the scope of the illustrative embodiments.

With reference to FIG. 5, this figure depicts a block diagram of a classification of services in accordance with an illustrative embodiment. Any of services 502, 504, 506, 508, and 510 may be implemented using service 402 in FIG. 4. Any of metadata 512, 514, 516, 518, and 520 may be implemented using metadata 404 in FIG. 4.

FIG. 5 is described with respected to services only as an example and is similarly applicable to components of other types within the scope of the illustrative embodiments. Furthermore, FIG. 5 is described using an example from the insurance industry for the clarity of the description. Services and components in other industries and data processing environments may also be similarly classified.

The various types of metadata may be used to classify services and components into classifications. A classification is a grouping of objects, such as components, according to a common trait or similarity among those objects. The process of classification is classifying the objects into classifications. A classification is also known as a category. The process of classification is also known as categorizing. When an object is classified into a classification, the object may also be said to have been categorized into a category.

In one embodiment, classifications of services and components may be created to be relevant to groups or sets of policies. For example, a classification of services may include those services whose usage metadata informs that those services are external facing.

As another example, a classification of services may include those services whose deployment metadata informs that those services are deployed on a J2EE platform. As another example, a classification of services may include those services whose metadata, may inform that those services need access to "Check Credit" component. As another example, a classification of services may include those services whose usage metadata informs that those services are web services.

Of course, the classifications and the metadata used for categorizing services and components in those classifications are only examples and are not intended to be limiting on the illustrative embodiments. Many other classifications of services and components will be conceivable from this disclosure and are contemplated within the scope of the illustrative embodiments.

In FIG. 5, an example classification to classify external facing services is depicted as External Access classification 522. As an example, service 502 may be a purchase order service, and service 504 may be a claim submission service. Each of these services may be used by any user over a public data network, such as Internet. A service that may be classified in External Access classification 522 may include a keyword or code in the service's metadata that is some variation of the word "external" that may help ease the classification process. However, such a word or code may not exist in the metadata of a service created by an unknown developer. Other metadata of a service may be interpreted to learn that the service is external facing, or belonging to "External Access" classification.

Note that neither service 502 nor service 504 includes any form of the word "external" in metadata 522 or 524 respectively. The words "PO" or "order process" in metadata 512 may be interpreted to learn that service 502 is an external facing service. Similarly, the words "Customer claim" or "natural disaster claim" in metadata 514 may be interpreted to learn that service 504 is an external facing service. Conversely, a set of services, such as billing service 506, quote service 508, and adjustment service 510, may be classified as belonging to "Internal Access" classification 524.

The description of "External Access" classification 522, "Internal Access" classification 524, and the particular metadata interpreted to classify services 502, 504, 506, 508, and 510 are only used as examples and are not limiting on the illustrative embodiments. Other metadata may be similarly interpreted to classify services into classifications suitable for particular implementations.

In FIG. 5, sets of policies are shown associated with classifications of services according to an illustrative embodiment. As an example, policy 526 may be a security policy implemented by a user in the information technology department of the insurance company, for external access services. Example security policy 526 may specify that for a service classified as an external access service, the service should present a security assertion markup language (SAML) token, have message level protection, and the user using the service has to be authenticated using a particular directory server.

As another example, policy 528 may be a security policy implemented by the user for services belonging to "Internal Access" classification 524. Example security policy 528 may specify that for a service classified as an internal access service, the service should present a Kerberos® token, have transport level protection, and the user using the service has to be authenticated using a particular directory server. Kerberos is a trademark of Massachusetts Institute of Technology (MIT) in the United States and other countries.

Additionally, similar to associating a policy with a classification of services, a policy template may be associated with a classification of services. A policy template is a template or a policy structure that may be common to more than one policy. In some circumstances, a policy template may not only include the structure of the policy, but also some of the information used in the policies based on that policy template.

FIG. 5 depicts policy template 530 as being associated with "Internal Access" classification 524. By associating policy template 530 with "Internal Access" classification 524, one or more policies based on policy template 530 may be associated, or may become associated, with that classification.

Associating policies and policy templates with classifications of services or components is called policy management. Policy management also includes associating changed policies with classifications or changing policies that may already be associated with classifications in this manner.

Figure 6:
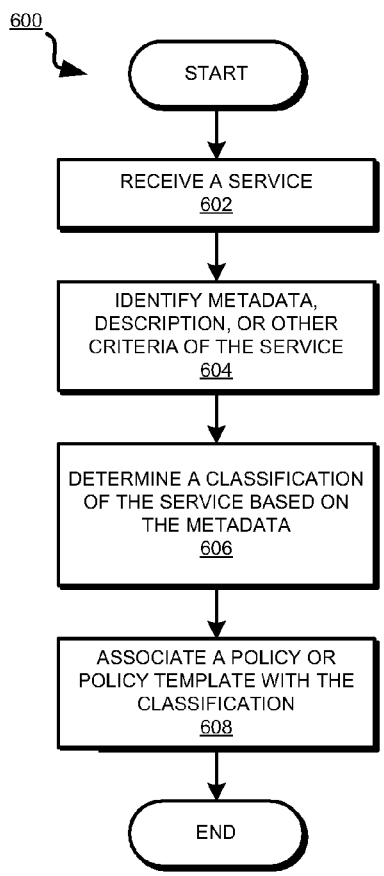
FIG. 6 depicts a flowchart of a process of classification and policy management for components in accordance with an illustrative embodiment.

With reference to FIG. 6, this figure depicts a flowchart of a process of classification and policy management for components in accordance with an illustrative embodiment. Process 600 may be implemented in a data processing system, such as server 104 or client 110 in FIG. 1. Furthermore, process 600 may itself be implemented as a software application, such as application 111 in FIG. 1, or a component, such as component 107 or service 105 in FIG. 1.

Process 600 begins by receiving a service (step 602). Process 600 may receive a service by either discovering a service in a data processing environment, importing a service from an identified source, or by manual or other configuration to gain awareness of a service. An implementation of process 600 may omit step 602, such as when services or components are already known in a data processing environment.

Process 600 identifies the metadata in the service or other comparable information about the service (step 604). Information comparable to metadata may be information that describes the service or provides criteria for using the service.

Process 600 determines a classification for the service based on the metadata or other comparable information (step 606). Process 600 associates a set of policies, policy templates, or a combination thereof with the classification (step 608). Process 600 ends thereafter. In one embodiment, step 608 may be omitted and process 600 may end after step 606.

Figure 7:
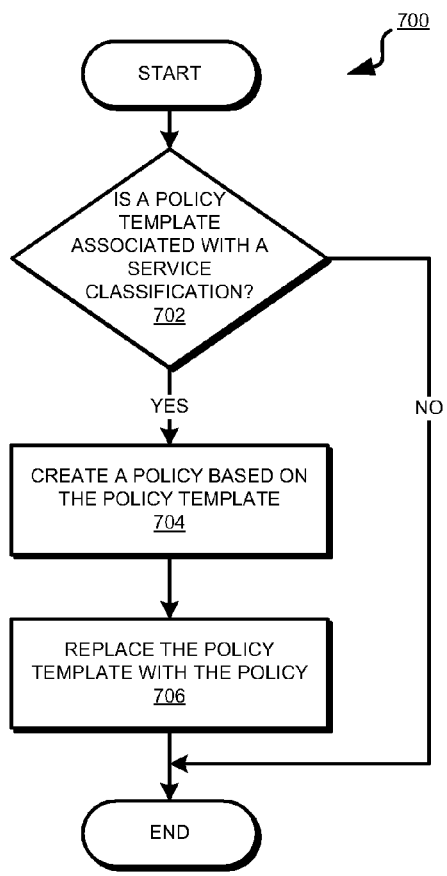
FIG. 7 depicts a flowchart of a process of associating a policy based on a policy template associated with a classification of services in accordance with an illustrative embodiment.

With reference to FIG. 7, this figure depicts a flowchart of a process of associating a policy based on a policy template associated with a classification of services in accordance with an illustrative embodiment. Process 700 may be implemented in a data processing system, such as server 104 or client 110 in FIG. 1. Furthermore, process 600 may itself be implemented as a software application, such as application 111 in FIG. 1, or a component, such as component 107 or service 105 in FIG. 1. Additionally, process 700 may be implemented in conjunction with process 600, such as in step 608, in FIG. 6.

Process 700 begins by determining if a policy template is associated with a classification of services or components (step 702). If process 700 determines that a policy template is not associated with a classification ("No" path of step 702), process 700 ends.

If, however, process 700 determines that a policy template is associated with a classification ("Yes" path of step 702), process 700 creates a policy based on the policy template (step 704). For example, a user may create a policy using the policy template identified in step 702 and filling in data in the structure provided by the policy template.

Process 700 associates the policy created in step 704 with the classification by replacing the policy template of step 702 with the policy of step 704 (step 708). Process 700 ends thereafter. In one embodiment, step 706 may not replace the policy template with the policy but associate the policy with the classification in addition to the policy template remaining associated with the classification.

Figure 8:
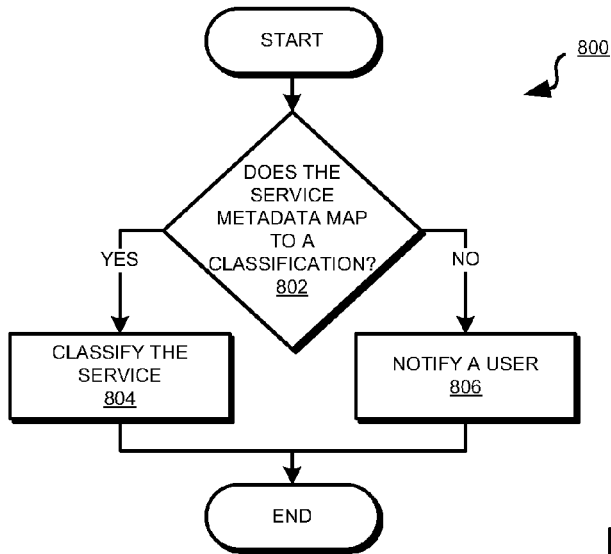
FIG. 8 depicts a flowchart of an alternate processing in the process for classification of services and components in accordance with an illustrative embodiment.

With reference to FIG. 8, this figure depicts a flowchart of an alternate processing in the process for classification of services and components in accordance with an illustrative embodiment. Process 800 may be implemented as a part of step 606 in process 600 FIG. 6.

Under certain circumstances, the metadata of a service may not be sufficient, or suitably interpreted, to assign the service to a particular classification. Process 800 begins by determining whether the service metadata maps to a classification (step 802). Mapping a metadata to a classification is interpreting the metadata to determine a classification for the service in the manner described with respect to FIGS. 4-5.

If process 800 determines that the service metadata maps to a classification ("Yes" path of step 802), process 800 classifies the service under the classification to which the metadata maps (step 804). Note that a metadata may map to more than one classification. In such as case, the service may be classified under more than one classification.

If process 800 determines that the service metadata does not map to a classification ("No" path of step 802), process 800 may notify a user (step 806). Process 800 ends thereafter. In one embodiment, in addition to or instead of notifying a user, process 800 may assign the service to a default classification, reject importation of the service, quarantine the service, audit the transactions involving the service, or take any other action suitable to a particular implementation without departing from the scope of the illustrative embodiments.

Figure 9:
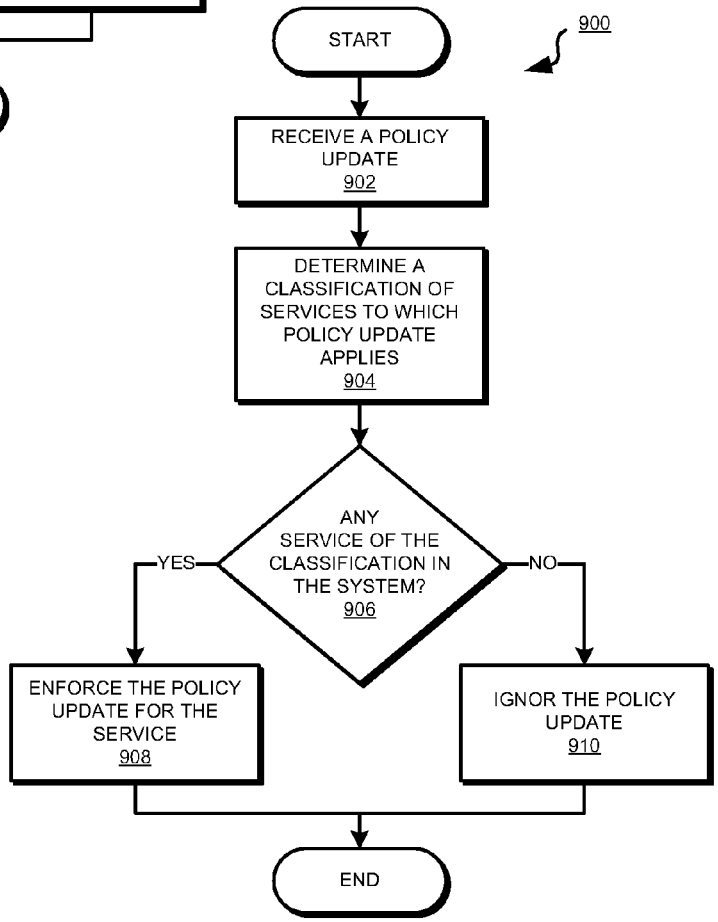
FIG. 9 depicts a flowchart of a process for associating policy changes with classifications of services or components in accordance with an illustrative embodiment.

With reference to FIG. 9, this figure depicts a flowchart of a process for associating policy changes with classifications of services or components in accordance with an illustrative embodiment. Process 900 may be implemented in a data processing system, such as server 104 or client 110 in FIG. 1. Furthermore, process 600 may itself be implemented as a software application, such as application 111 in FIG. 1, or a component, such as component 107 or service 105 in FIG. 1. Additionally, process 700 may be implemented in conjunction with process 600, such as another step following step 608, in FIG. 6.

Process 900 begins by receiving a policy update (step 902). In one embodiment, a policy update may include changes to policies or policy templates already associated with classifications. In another embodiment, a policy update may include newly added policies or policy templates.

Process 900 determines a classification to which the policy update applies (step 904). Process 900 determines if any services belonging to the classification of step 904 exist or are executing within the boundary of process 900 (step 906). For example, process 900 may be limited to applying policy updates to a particular data processing system. In such an example, process 900 may determine if a service classified under the classification of step 904 exists in that data processing system. Note that process 900 may not concern a service that is indeed classified under the classification of step 904 but one that exists in another data processing system.

If process 900 determines that a service belonging to the classification of step 904 exists or is executing within the boundary of process 900 ("Yes" path of step 906), process 900 enforces the policy update for that service (step 908). Process 900 ends thereafter:

If process 900 determines that a service belonging to the classification of step 904 does not exist within the boundary of process 900 ("No" path of step 906), process 900 ignores the policy update. Process 900 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for classification and policy management for software components. A component with which the illustrative embodiments may be used may implement a part of an application or an entire application. An application with which the illustrative embodiments may be used may include one or more components. A service with which the illustrative embodiments may be used may be a component or an application. A policy with which the illustrative embodiments may be used may be an actual policy or a policy template.

By implementing the illustrative embodiments, users may be able to apply policies to services and other types of software components in an efficient manner. Instead of having to apply a large number of policies to a large number of services individually, a user may be able to apply sets of policies or policy templates to classifications of services. This metadata based classification followed by policy association according to the illustrative embodiments may provide a metadata based policy management.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system.

(or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes, the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for classification and policy management for software components, the method comprising:
    identifying a metadata associated with a component;
    determining, to form a mapping determination, whether the metadata maps to a classification in a set of classifications;
    assigning, if the mapping determination is true, the component to the classification; and
    associating with the component, a policy associated with the classification.

2. The method of claim 1, further comprising:
    identifying the policy that is applicable to the classification; and
    associating the policy with the classification.

3. The method of claim 1, wherein because of the policy being associated with the classification, associating the policy with the component occurs automatically from associating the component to the classification.

4. The method of claim 1, wherein the policy is a policy template.

5. The method of claim 4, further comprising:
    determining, forming a policy template determination, whether the policy template is associated with one of (i) the component and (ii) the classification;
    creating, if the policy template determination is true, a second policy based on the policy template; and
    associating the second policy with one of the component and the classification.

6. The method of claim 5, wherein associating the second policy is replacing the policy template with the second policy.

7. The method of claim 5, wherein associating the second policy is associating the second policy in addition to the policy template.

8. The method of claim 1, further comprising:
    creating the set of classifications such that a first classification in the set of classifications is distinct from a second classification in the set of classifications because of a difference in a characteristic of a first set of components that can be classified under the first classification and the characteristic of a second set of components that can be classified under the second classification, wherein the first and the second classifications one of (i) have and (ii) do not have a common characteristic.

9. The method of claim 8, wherein the characteristic is similar in the first set of components, and the characteristic is one of (i) provided in a second metadata associated with a second component in the components, (ii) can be interpreted from the second metadata, (iii) described in the second component, and (iv) described in reference to the second component.

10. The method of claim 1, wherein the component is a service.

11. The method of claim 1, wherein if the mapping determination is false, performing one of (i) notifying a user and (ii) classifying the component in a default classification.

12. A method for classification and policy management for software components, the method comprising:
    identifying a policy that is applicable to a classification;
    associating the policy with the classification;
    assigning a component to the classification based on a metadata associated with the component; and
    associating with the component, the policy by virtue of the policy being associated with the classification.

13. The method of claim 12, wherein the assigning the component further comprises:
    identifying the metadata associated with a component;
    determining, to form a mapping determination, whether the metadata maps to the classification; and
    assigning, if the mapping determination is true, the component to the classification.

14. The method of claim 12, wherein the policy is a policy template, the method further comprising:
    creating a second policy based on the policy template; and
    associating the second policy with one of the component and the classification.

15. The method of claim 14, wherein associating the second policy is one of (i) replacing the policy template with the second policy, and (ii) associating the second policy in addition to the policy template.

16. The method of claim 12, further comprising:
    creating a set of classifications such that a first classification in the set of classifications is distinct from a second classification in the set of classifications because of a difference in a characteristic of a first set of components that can be classified under the first classification and the characteristic of a second set of components that can be classified under the second classifications, and wherein the characteristic is one of (i) provided in a second metadata associated with a second component, (ii) can be interpreted from the second metadata, (iii) described in the second component, and (iv) described in reference to the second component.

17. A method for classification and policy management for software components, the method comprising:
    creating a set of classifications using a first characteristic of a first set of components to classify the first set components in a first classification in the set of classifications, and using a second characteristic of a second set of components to classify the second set of components in a second classification in the set of classifications;
    identifying a policy that is applicable to the first classification;
    associating the policy with the first classification;
    assigning a component from the first set of components to the first classification based on an indication of the first characteristic in a metadata associated with the component; and
    associating with the component, the policy by virtue of the policy being associated with the first classification.

18. The method of claim 17, wherein the policy is a policy template, the method further comprising:

determining, forming a policy template determination, whether the policy template is associated with one of (i) the component and (ii) the first classification;

creating, if the policy template determination is true, a second policy based on the policy template; and associating the second policy with one of the component and the first classification.

19. The method of claim 18, wherein associating the second policy is one of (i) replacing the policy template with the second policy, and (ii) associating the second policy in addition to the policy template.

20. The method of claim 17, wherein the first common characteristics is one of (i) provided in the metadata of the component, (ii) can be interpreted from the metadata of the component, (iii) described in the component, and (iv) described in reference to the component.

21. A computer usable program product comprising a computer usable medium including computer usable code for classification and policy management for software components, the computer usable code comprising:

computer usable code for identifying a metadata associated with a component;

computer usable code for determining, to form a mapping determination, whether the metadata maps to a classification in a set of classifications;

computer usable code for assigning, if the mapping determination is true, the component to the classification; and computer usable code for associating with the component, a policy associated with the classification.

22. The computer usable program product of claim 21, further comprising:

computer usable code for identifying the policy that is applicable to the classification; and computer usable code for associating the policy with the classification.

23. The computer usable program product of claim 21, wherein because of the policy being associated with the classification, the computer usable code for associating the policy with the component assigns the policy to the component automatically in assigning the component to the classification.

24. The computer usable program product of claim 21, wherein the policy is a policy template.

25. The computer usable program product of claim 24, further comprising:

computer usable code for determining, forming a policy template determination, whether the policy template is associated with one of (i) the component and (ii) the classification;

computer usable code for creating, if the policy template determination is true, a second policy based on the policy template; and computer usable code for associating the second policy with one of the component and the classification.

26. The computer usable program product of claim 25, wherein the computer usable code for associating the second policy is one of (i) computer usable code for replacing the policy template with the second policy, and (ii) computer usable code for associating the second policy in addition to the policy template.

27. The computer usable program product of claim 21, further comprising:

computer usable code for creating the set of classifications such that a first classification in the set of classifications is distinct from a second classification in the set of classifications because of a difference in a characteristic of a first set of components that can be classified under the first classification and the characteristic of a second set of components that can be classified under the second classification.

28. The computer usable program product of claim 27, wherein the characteristic is similar in the first set of components, and the characteristic is one of (i) provided in a second metadata associated with a second component in the components, (ii) can be interpreted from the second metadata, (iii) described in the second component, and (iv) described in reference to the second component.

29. The computer usable program product of claim 21, wherein if the mapping determination is false, the computer usable program product further comprising:

computer usable code for performing one of (i) notifying a user and (ii) classifying the component in a default classification.

30. A data processing system for classification and policy management for software components, the data processing system comprising:

a storage device, wherein the storage device stores computer usable program code; and a processor, wherein the processor executes the computer usable program code, and wherein the computer usable program code comprises:

computer usable code for identifying a policy that is applicable to a classification;

computer usable code for associating the policy with the classification;

computer usable code for assigning a component to the classification based on a metadata associated with the component;

computer usable code for associating automatically with the component, the policy by virtue of the policy being associated with the classification.

31. The data processing system of claim 30, wherein the assigning the component further comprises:

computer usable code for identifying the metadata associated with a component;

computer usable code for determining, to form a mapping determination, whether the metadata maps to the classification; and computer usable code for assigning, if the mapping determination is true, the component to the classification.

32. The data processing system of claim 30, wherein the policy is a policy template, the method further comprising:

computer usable code for creating a second policy based on the policy template; and computer usable code for associating the second policy with one of the component and the classification.

33. The data processing system of claim 32, wherein the computer usable code for associating the second policy is one of (i) computer usable code for replacing the policy template with the second policy, and (ii) computer usable code for associating the second policy in addition to the policy template.

34. The data processing system of claim 30, further comprising:
   computer usable code for creating a set of classifications such that a first classification in the set of classifications is distinct from a second classification in the set of classifications because of a difference in a characteristic of a first set of components that can be classified under the first classification and the characteristic of a second set of components that can be classified under the second classifications, and wherein the characteristic is one of (i) provided in a second metadata associated with a second component, (ii) can be interpreted from the second metadata, (iii) described in the second component, and (iv) described in reference to the second component.

* * * * *